Patented Dec. 22, 1953

2,663,747

UNITED STATES PATENT OFFICE 2,663,747

AQUEOUS COATING COMPOSITIONS FROM CHLORINATED EMULSIFIER-STABILIZED LATEX

Petrus Ten Have, Wijk Maastricht, Netherlands, assignor to Rubber-Stichting, Delft, Netherlands No Drawing. Application May 19, 1950, Serial No. 163,084

Claims priority, application Netherlands May 31, 1949

8 Claims. (Cl. 260—735)

This invention relates to a process for manufacturing water impermeable films of chlorinated rubber from aqueous dispersions thereof.

The principal object of the present invention is to provide a simple and reliable method for manufacturing impermeable films of chlorinated rubber. Another object of the invention is to manufacture an impermeable film of chlorinated rubber from an aqueous dispersion of chlorinated rubber. A further object of the invention is to provide a method for the manufacturing of unsupported films of chlorinated rubber. Still another object of the invention is to provide a method for manufacturing films of chlorinated rubber without using heat and pressure. Another object of the invention is to provide a method for the production of an aqueous dispersion of chlorinated rubber from which can be produced an impermeable self-supporting film without the application of subnormal pressure. Other objects will become apparent from the following description.

It is known to produce films of chlorinated rubber from a solution of chlorinated rubber in volatile solvents, if desired, mixed with a plasticizer.

It is also known to make an aqueous dispersion of ordinary chlorinated rubber and a plasticizer, from which aqueous dispersion a dense film can, however, only be produced by the use of hot calenders or stacks. The dry powder which remains after the evaporation of the water can only be fused into a coherent film and, if desired, at the same time welded to the base by subjecting the layer to a treatment by heated rolls.

In the operation of the process of the present invention impermeable films of chlorinated rubber are manufactured by forming a thin layer of an aqueous dispersion of a mixture of a plasticizer and chlorinated rubber, which has been produced by chlorinating an acid-reacting aqueous dispersion of unmasticated rubber and which has a chlorine content of at most 61%, preferably between 55 and 60%; evaporating the water from the thin layer of the dispersion and allowing the remaining plasticized chlorinated rubber to flow into a dense, homogeneous film without the application of pressure thereto. The evaporation of the water leaves numerous separate globules of the solid ingredients of the dispersion.

I have discovered the remarkable fact that these separate globules merge or coalesce into a clear, coherent, strong, water impermeable film without applying pressure, only when the chlorinated rubber and the plasticizer, as well as their relative amounts in the aqueous dispersions, satisfy the conditions given in this specification. The process can be accelerated by applying heat.

One example of the process of the present invention is given for the production of a water-impermeable film on wood, which example shows especially the acceleration of the film formation by applying heat.

A 40% emulsion of chlorinated rubber having a chlorine content of 57% was prepared by chlorinating latex, stabilized against acid coagulation by the presence of 2% of "Emulphor O" (an emulsifier sold by the General Dyestuff Corp. and believed to be the reaction product polyethylene oxide with oleylalcohol) (calculated on the rubber) and acidified with hydrochloric acid to a normality 8 and chlorinated until the desired chlorine content was obtained. The chlorinated rubber separated from this latex by coagulation with alcohol was dispersed in a ball mill with water and a slight quantity of an emulsifier of the non-ionic type, consisting in the reaction product of polyethylene oxide with an alkylated phenol. To this dispersion a 65% emulsion of dibutylsebacate was added in a quantity of 20 parts of the plasticizer to 100 parts of chlorinated rubber.

The emulsion obtained was applied to a wooden surface by spraying and gave after standing for about 60 minutes at room temperature a completely homogeneous and dense film.

Another part of the wooden surface coated with the same aqueous dispersion of chlorinated rubber was exposed to infra-red radiation, whereby its temperature was increased to 50 to 60° C., in this case the film formation was completed in less than 10 minutes.

A second example of the process of the present invention is given for the production of a self-supporting, transparent film of chlorinated rubber.

The chlorinated rubber prepared as in Example 1 was dispersed in a ball mill with water and a slight quantity of soap.

To this emulsion a 65% emulsion of dibutylsebacate was added in a quantity of 10 parts of the plasticizer to 100 parts of chlorinated rubber.

By spreading such an emulsion on a smooth metal band which may e. g. consist of aluminum or stainless steel, the desired film is obtained. Within a few minutes after heating at 70° C. the film can be stripped off the metal surface.

A third example of the process of the present invention is given for the preparation of a chlorinated rubber coating material to which a pigment has been added as a filler. To a dispersion of chlorinated rubber having a chlorine content of 58% produced as described in patent application Serial No. 775,155, filed September 19, 1947, 100 parts by weight of titanium white and 30 parts by weight of chlorinated diphenyl were added per 100 parts by weight of chlorinated rubber. The emulsion was spread on a textile and by slight heating worked up to a flexible film which could be folded without showing cracks and adheres tenaciously to the fabric.

A fourth example of the process of the present invention shows how the permeability for water vapour of films containing a plasticizer in such a large amount that they can be formed in a short time without heating is favorably influenced by the further addition of a slight quantity of a high molecular substance to the dispersion. Films prepared from dispersions of the following composition (in parts by weight) were compared.

| Chlorinated rubber (chlorine content 60%) | Dibutyl-sebacate | Added as aqueous dispersion | Permeability for water vapor, g. cm./cm.$^2$mm./hour |
|---|---|---|---|
| 100 | 25 | | $6 \times 10^{-8}$ |
| 100 | 25 | 2½ rubber | $2.2 \times 10^{-8}$ |
| 100 | 25 | 10 cyclized rubber | $3.3 \times 10^{-8}$ |
| 100 | 25 | 10 polyvinylchloride | $4.2 \times 10^{-8}$ |

The chlorinated rubber which should be used in the process of the present invention is obtained by allowing chlorine to react with latex to which so much acid has been added that an acid liquid with a normality of at least 1 has been obtained and which latex has been stabilized beforehand in such a manner that it does not coagulate by the said addition of acid. This process for preparing aqueous chlorinated rubber dispersions free from organic solvents is more fully described in Patent No. 2,586,124 and the thus obtained product is distinguished from the chlorinated rubber prepared in solution by the fact that the rubber molecules have not been broken down.

The chlorinated rubber prepared according to the said patent is especially distinguished from the chlorinated rubbers prepared by the chlorination of latex in other ways by very low oxygen content and moreover by a somewhat lower chlorine content and by its insolubility in the usual organic solvents for chlorinated rubber. Whereas it is general practice, when chlorinating rubber in solution, to obtain a chlorinated rubber with approximately 65–68% of chlorine, it appears that the chlorination in latex does not easily proceed further than a chlorine content of approximately 60%. Although this chlorinated rubber with a relatively low chlorine content has less favorable properties with respect to the heat and light stability compared with the chlorinated rubber prepared in solution, it appears that the lower softening point renders this chlorinated rubber excellently suitable for the application of the process of the present invention. An additional advantage of the chlorinated rubber prepared according to the process of the said patent is the insolubility which is caused by the fact that the rubber molecules have not been broken down at all. It is known that rubber which has been separated from latex and thereupon masticated by rollers, owing to this treatment in the presence of oxygen has suffered a decomposition which decomposition deliberately is continued to a very high degree when it is desired to prepare concentrated solutions of rubber as applied in the manufacture of chlorinated rubber. The insolubility of the chlorinated rubber which is preferably used according to the present invention renders an application of a packing material treated with this chlorinated rubber possible when packing oils, fats and the like products which would in the long run dissolve a further broken down chlorinated rubber.

The preparation of an aqueous dispersion of the chlorinated rubber used in the process of the present invention is easily accomplished by simply milling the precipitated and washed chlorinated rubber with a suitable amount of water and a suitable emulsifying agent in a ball mill. Other devices, as used in the paint industry e. g. a colloid mill can be used.

As an emulsifier for the preparation of the dispersion of chlorinated rubber and plasticizer one of the numerous substances which are on the market for this purpose can be used, such as sulphonated oils or hydrocarbons, cationic or invert soaps, non-ionic emulsifiers and also natural products such as casein. I prefer to use an emulsifying agent which will give a stable suspension when used in an amount between 1–5% calculated on chlorinated rubber. The plasticizer exerts a gelling action on the chlorinated rubber. To obtain clear coherent films in a reasonable time, it is necessary to use a fairly large amount of plasticizer, which should, however, be sufficiently miscible with the chlorinated rubber. Some suitable plasticizers are dibutylsebacate, tricresylphosphate, dibutylphthalate, dioctylphthalate, dioctylsebacate, butyloleate.

These plasticizers can be used together with other substances which may exert less plasticizing action when used alone or which may not be sufficiently compatible with the chlorinated rubber when used without a mutual solvent plasticizer. Examples of such substances, giving excellent films when used together with dibutylsebacate or dibutylphthalate are paraffin oil and other mineral oils. These substances tend to make the film more stretchable and elastic. When less elastic properties are desired, aqueous dispersions of cyclized rubber or of polyvinylchloride can be added to the chlorinated rubber dispersion. The cyclized rubber is preferably prepared by cyclizing a stabilized natural rubber latex, prepared according to the process described and claimed in the copending application Serial No. 59,190, filed November 9, 1948, now U. S. Patent 2,555,068, which process leads to the formation of an aqueous dispersion of cyclized rubber having particles of about the same size as the original rubber latex. The polyvinylchloride should be prepared by emulsion polymerisation and is preferably used as the dispersion resulting therefrom. An aqueous dispersion of a natural or synthetic rubberlike material can also be added to the aqueous dispersion of the chlorinated rubber, whereby the impermeability of the finally obtained film can be greatly improved. Examples of suitable rubberlike materials are Hevea-rubber, "neoprene" (a polymer of 2-chlorobutadiene); GR–A (a copolymer of butadiene and acrylonitrile) and GR–S (a copolymer of butadiene and styrene). These rubbers are at present available as aqueous dispersions. Relatively extensible, transparent films can be produced by using from 2 to 20% of the rubberlike substance calculated on the chlorinated rubber.

The film formation without pressure and at room temperature proceeds more easily when the amount of plasticizers is increased and when the chlorinated rubber used has a lower chlorine content.

The quantity of added plasticizer can range from 10 to 35% (calculated on the amount of chlorinated rubber). The amount of plasticizer has a great influence on the quality of the film e. g. the elasticity and the stickiness. An amount of plasticizer exceeding 35% gives a film having a stickiness too high for practical uses. Very good elastic qualities are obtained by films containing 15 to 25% of plasticizer. Starting from a chlorinated rubber with higher chlorine content more plasticizer has to be added than when a chlorinated rubber with a lower chlorine content is used as a starting material. The composition of two emulsions from which chlorinated rubber films can be manufactured starting from the same chlorinated rubber (with 60% Cl) but which emulsions contain different percentages of chlorinated rubber and which content is given in schedule here below.

|  | I | II |
| --- | --- | --- |
|  | Percent | Percent |
| Chlorinated rubber | 25 | 45 |
| Dibutylsebacate | 7.5 | 10 |
| Emulphor O | 0.5 | 0.5 |
| Water | 67.0 | 44.5 |
|  | 100 | 100 |

Intermediate concentrations of chlorinated rubber can also be used, without much effect upon the properties of the finally obtained film.

Water impermeable continuous films can be obtained by drying, without the application of heat or pressure, a thin layer of an aqueous dispersion containing the following components in the proportions specified:

Chlorinated rubber having a chlorine content of from—

|  | Parts by weight |
| --- | --- |
| 50–60% by weight | 25 –45 |
| Dibutylsebacate | 1.5 –16 |
| Emulsifying agent | 0.25– 2.2 |
| Water to make up | 100 |

Dibutylsebacate is especially suitable as a plasticizer in the process according to the present invention but also other esters of sebacic acid and of phthalic acid and of phosphoric acid come into consideration as well as chlorinated diphenyl. With the last mentioned plasticizer a non-adhering film can only be obtained with difficulty; this renders this kind of plasticizer less suitable for the production of self-supporting films, but particularly suitable for the application in films which should strongly adhere to the base.

In general heating to a temperature between 40 and 60° C. will be sufficient for the film formation to take place in a few minutes. The heating can, however, be increased without drawback to a little below 100° C. in which case the film formation takes place in a still shorter time; but no further advantages are obtained. A film can also be obtained without any heating in which case, however, a longer period of time is necessary, which appears to be due almost entirely to the slower evaporation of the water.

An important application of the films combined with paper or cardboard according to the present invention consists in their use for packing material. The decreased stability to light cannot produce a disadvantage when care is taken that the film is protected against light by the paper layer. Since in this manner also the paper or cardboard is protected against attack, if any, by ingredients in the packed substances, in this manner a simple and efficient packing material is found for substances which so far could only be packed in tins or the like hermetically sealed materials.

The stability of the films of chlorinated rubber obtained with respect to heat and light can be improved by adding in some stage of the preparation substances which already in small quantities have a favorable influence on the stability, such as e. g. amines or metal oxides.

The permeability for water vapour of the films obtained depends on the thickness and on the quantity and kind of the plasticizer used. In a film containing 10 parts of dibutylsebacate per 100 parts of chlorinated rubber and having a thickness of 0.02–0.03 mm. a permeability for water vapor of approximately 0.7 to $0.1 \times 10^{-3}$ g. cm./cm.$^2$ mm./hour can be obtained.

I claim:

1. In the manufacture of water-impermeable films of rubber chloride, the process which comprises forming such a film from a coating composition consisting substantially of an aqueous dispersion, free from organic solvents, of from about 25 to 45 per cent by weight of a finely-divided rubber chloride having a chlorine content of from about 50 to 60 per cent by weight and being substantially free from oxygen and substantially insoluble in organic solvents; and of from about 10 to 35 per cent by weight, based on the weight of the rubber chloride, of a plasticizer which is miscible with the rubber chloride and exerts a gelling action thereon; and evaporating the water from said film thus causing the dispersed, plasticized chlorinated rubber to coalesce into an impermeable homogeneous film without heating above about 100° C. and without the application of pressure; said finely-divided chlorinated rubber resulting from the chlorination of an aqueous dispersion of an unmasticated rubber containing acid in a concentration of at least about 1 normal and an emulsifier stabilizing it against acid coagulation.

2. The process of claim 1 wherein said aqueous dispersion contains from about 0.25 to 2.2 per cent of an emulsifying agent.

3. The process of claim 1 wherein said film is formed by applying the said aqueous dispersion to a smooth surface, followed by evaporation of the water therefrom and then stripping the film from the surface to form a self-supporting film.

4. The process of claim 1 wherein said film is formed by applying the said aqueous dispersion to paper and cardboard whereby upon evaporation of the water therefrom a firmly adherent water-impermeable film is formed, the product being suitable for use as a packing material.

5. The process of claim 1 wherein water is evaporated from said film by heating it to a temperature below 100° C.

6. The process of claim 5 wherein the heating is produced by exposing the film to infra-red radiation.

7. A coating composition consisting substantially of from about 25 to 45 per cent by weight of a chlorinated rubber, having a chlorine content within the range of from about 50 to 60 per cent by weight, from about 10 to 35 per cent by weight, based on the weight of the chlorinated rubber, of a plasticizer which is miscible with the rubber chloride and exerts a gelling action thereon, a small amount of a compatible emulsifier and a vehicle of water; the rubber chloride in said composition being substantially free from oxygen, being substantially insoluble in organic solvents and resulting from the chlorination of an aqueous dispersion of an unmasticated rubber containing acid in a concentration of at least about 1 normal and an emulsifier stabilizing it against acid coagulation followed by recovery of the finely-divided chlorinated rubber from the resulting chlorinated dispersion.

8. In the manufacture of water-impermeable films of chlorinated rubber, the process which comprises forming such a film from an aqueous dispersion containing from about 25 to 45 parts by weight of a finely-divided chlorinated rubber having a chlorine content of from about 50 to 60 per cent by weight and being substantially free from oxygen and substantially insoluble in organic solvents, from about 0.25 to 2.2 parts by weight of emulsifying agent and from about 1.5 to 16 parts by weight of dibutyl sebacate, the water present being sufficient to make a total of 100 parts by weight; and evaporating the water from said film thereby causing the dispersed particles of rubber chloride to coalesce into an impermeable continuous film without heating above about 100° C. and without applying pressure; the rubber chloride in said aqueous dispersion resulting from the chlorination of an aqueous dispersion of an unmasticated rubber containing acid in a concentration of at least 1 normal and an emulsifier stabilizing it against acid coagulation.

PETRUS TEN HAVE.

References Cited in the file of this patent

UNITED STATES PATENTS

| Number | Name | Date |
| --- | --- | --- |
| 2,008,558 | Laufenberg | July 16, 1935 |
| 2,161,454 | Calvert | June 6, 1939 |
| 2,333,887 | Redlinger | Nov. 9, 1943 |
| 2,374,759 | Latour | May 1, 1945 |
| 2,416,447 | Laughlin et al. | Feb. 25, 1947 |
| 2,423,555 | Ender | July 8, 1947 |
| 2,536,789 | Van Amerongen | Jan. 2, 1951 |
| 2,586,124 | Van Amerongen | Feb. 19, 1952 |

FOREIGN PATENTS

| Number | Country | Date |
| --- | --- | --- |
| 418,068 | Great Britain | Oct. 18, 1934 |
| 634,241 | Great Britain | Mar. 15, 1950 |